(12) United States Patent
Inoue et al.

(10) Patent No.: US 6,268,079 B1
(45) Date of Patent: Jul. 31, 2001

(54) NONAQUEOUS-ELECTROLYTE BATTERY (75) Inventors: Takefumi Inoue; Shinya Kitano, both of Kyoto (JP)

(73) Assignee: Japan Storage Battery Co., Ltd., Kyoto (JP)

(*) Notice: Subject to any disclaimer, the term of this patent is extended or adjusted under 35 U.S.C. 154(b) by 0 days.

(21) Appl. No.: 09/449,927

(22) Filed: Nov. 24, 1999

(30) Foreign Application Priority Data

Nov. 25, 1998 (JP) .................................................. 10-333978
Dec. 28, 1998 (JP) .................................................. 10-377335

(51) Int. Cl.$^7$ .................................................. H01M 2/08
(52) U.S. Cl. .................................. 429/184; 429/171
(58) Field of Search .............................. 429/231.95, 94, 429/163, 171, 174, 175, 178, 181, 185, 233; 174/50.61

(56) References Cited

U.S. PATENT DOCUMENTS

| | | | |
|---|---|---|---|
| 4,812,376 | * 3/1989 | Rudolph | 429/101 |
| 5,004,656 | * 4/1991 | Sato et al. | 429/162 |
| 5,030,525 | * 7/1991 | Hisatomi et al. | 429/101 |
| 5,821,011 | * 10/1998 | Taylor et al. | 429/181 |
| 6,117,195 | * 9/2000 | Honegger | 29/623.2 |

* cited by examiner

Primary Examiner—Gabrielle Brouillette
Assistant Examiner—M. Wills
(74) Attorney, Agent, or Firm—Sughrue, Mion, Zinn, Macpeak & Seas, PLLC

(57) ABSTRACT

A metallic ring is insulatedly sealed around each of the positive electrode terminal and negative electrode terminal, previously, by the glass hermetic seal and ceramic hermetic seal in such a manner that it is sealed into the opening hole of the cover plate of a battery case. In this case, in order to prevent the corrosion of a metallic brazer which may occur in the ceramic hermetic seal and improve the workability, the ceramic material is brazed around the negative electrode terminal through a Au—Cu brazer or P—Cu brazer.

10 Claims, 8 Drawing Sheets

NONAQUEOUS-ELECTROLYTE BATTERY

BACKGROUND OF THE INVENTION

1. Field of the Invention

The present invention relates to a nonaqueous-electrolyte battery in which terminals electrically connected to a positive and a negative electrode are hemetically sealed (hereinafter referred to as simply "sealed") in an opening hole of a cover plate of a battery case.

2. Description of the Related Art

The nonaqueous-electrolyte battery to which the present invention is applied should not be particularly limited. Now, as an example, an explanation will be given of a typical structure of a large-scale large-capacity elliptical-cylindrical nonaqueous battery 1. As seen from FIG. 4, a power generating element 1 of the nonaqueous-electrolyte battery is composed of a belt-shaped positive electrode (cathode) 1a and a belt-shaped negative electrode (anode) 1b which are wound in an elliptical-cylinder through a belt-shaped separator 1c. These positive electrode 1a and negative electrode 1b are wound in a manner displaced vertically little by little so that the lower end of the positive electrode 1a protrudes downwards and the upper end of the negative electrode 1b protrudes upwards. A negative collector 5 is hermetically connected (hereinafter referred to as simply "connected") to the upper end of the negative electrode 1b of the power generating element 1 which protrudes upwards. The negative collector 5 is made by stamping a metallic plate and folded to form slits. The upper end of the negative electrode 1b is inserted in and connected to the respective slits by caulking or welding. A negative electrode terminal 4 is connected to the negative collector 5 by caulking or welding so that it protrudes upward. A positive collector 3 is connected to the lower end of the positive electrode 1a of the power generating element 1 which protrudes downwards. The one end of the positive collector 3 is extended to the negative collector 5 along the power generating element 1 to reach the upper side thereof. A positive electrode terminal 2 is connected to the positive collector 3 by caulking or welding.

Figure 5:
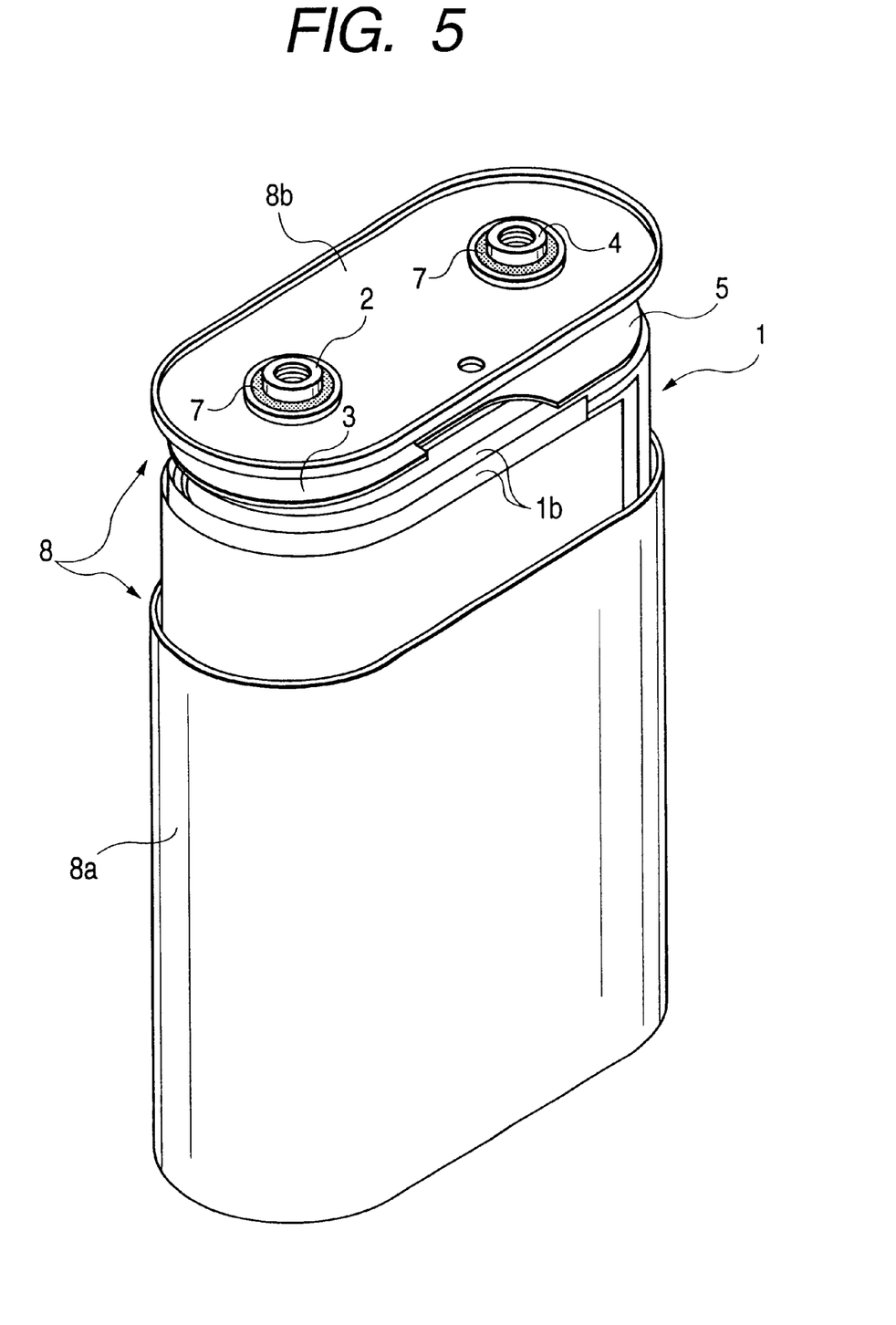
FIG. 5 is an exploded perspective view of the battery case of an nonaqueous-electrolyte battery according to the conventional art.

The power generating element 1, to which the positive collector 3 and the negative collector 5 are connected, is housed within an elliptical-cylindrical case body 8a of a battery case 8 as shown in FIG. 5. The positive electrode terminal 2 and negative electrode terminal 4 which are connected to the positive collector 3 and negative collector 5 are passed through the opening holes located at two positions of the elliptical-cylindrical cover plate 8b. These electrode terminals 2 and 4 are insulatedly sealed by insulating materials between themselves and the opening holes. The cover plate 8b is fit in the upper opening of the case body 8a and its periphery is sealed by welding. Thus, the battery in which the positive electrode terminal 2 and negative electrode terminal 4 protrude upward from the opening holes of the cover plate 8b of the battery case 8 is constructed.

These electrode terminals 2 and 4 can be insulatedly sealed by means of the techniques of glass hermetic sealing and ceramic hermetic sealing.

Figure 6:
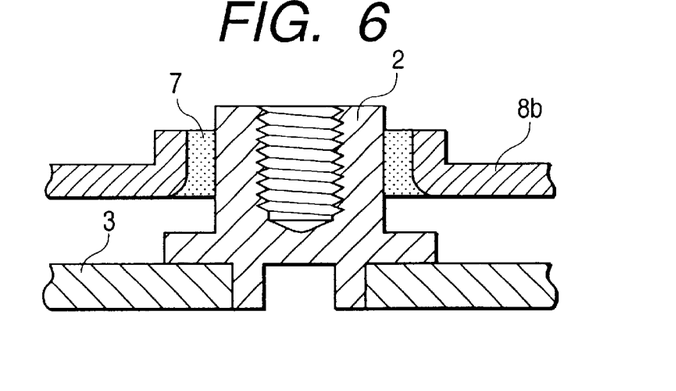
FIG. 6 is an enlarged longitudinal sectional view of the positive electrode terminal portion of an nonaqueous-electrolyte battery according to the conventional art.

However, these techniques have the following defects. For example, where the positive electrode 2 is formed by the glass hermetic sealing technique, as shown in FIG. 6, glass is molten between the positive electrode terminal 2 and cover plate 8b in a furnace at a high temperature of about 300 to 600° C., and hardened to form a glass hermetic seal 7. However, in the state where the power generating element 1 is connected to the positive electrode terminal 2 as described above, actually, the working of forming the glass hermetic seal cannot be carried out. This is because the power generating element 1 cannot withstand the above high temperature and hence the glass cannot be molten. This applies to the case where the negative electrode terminal 4 is formed.

Further, in the battery manufactured by means of the ceramic hermetic seal technique, as seen from FIGS. 7, 8, 9 and 10, the positive electrode terminal 2 and the negative electrode terminal 4 are insulatedly secured to the battery case through the ceramic material 9, respectively. Each of these positive and negative electrode terminals 2 and 4 with the ceramic material 9 fit thereover is inserted in the opening hole of the cover plate 8b. In this state, a metallic brazer (brazing metal) 10a is secured between each electrode terminal 2, 4 and the ceramic material 9, and a metallic brazer (brazing metal) 10b is secured between the ceramic material 9 and the opening hole of the cover plate 8b. The metallic brazers 10a, 10b are molten in a furnace at a high temperature of about 1000° C. and hardened so that sealing is made between each electrode terminal 2, 4 and the ceramic material 9, and between the ceramic material 9 and the opening hole of the cover plate 8b. However, in the state where the power generating element 1 is connected to the positive electrode terminal 2 or the negative electrode terminal 4 as described above, actually, the working of sealing/securing cannot be carried out. The reason therefor is the same as the case of using the glass hermetic sealing technique.

As described above, the power generating element 1 cannot be exposed to the environment at a high temperature. Therefore, in the conventional art, the following working of connection is carried out. The positive and negative electrode terminals 2 and 4 are previously insulatedly sealed to the cover plate 8b by means of the glass hermetic sealing or ceramic hermetic sealing technique. Thereafter, the positive collector 3 and negative collector 5 which are connected to these positive electrode 2 and the negative electrode terminal 4 are connected to the power generating element 1. Otherwise, the positive electrode terminal 2 and negative electrode terminal 4 are connected to the positive collector 3 and the negative collector 5 which are connected to the power generating element 1.

Therefore, conventionally, such a working of connection must be carried out by caulking or welding with a special jig inserted in a lower gap of the cover plate 8b. In this case, the workability is very poor. In addition, the reliability of the connecting portion is deteriorated owing to such a difficult working. Further, there was also a problem that a redundant space is required in order to assure the space for working and the battery capacity is reduced correspondingly.

Particularly, in a cylindrical or elliptical-cylindrical battery, the connection among the collector and terminal must be carried out in a small space at the end in an axial direction of the power generating element by caulking or welding. The poor workability in this case was very problematic.

For the reasons described above, conventionally, in many cases, without using the glass hermetic sealing technique or ceramic sealing technique, each of the positive electrode terminal 2 and the negative electrode terminal 4 is passed through the opening hole of the cover plate 8b through a sealing member such as an O-ring or a washer of synthetic resin and tightened by a nut so that it is insulatedly sealed. However, the sealing member such as the O-ring or washer of synthetic resin is likely to deteriorate with time. Therefore, there was a problem that the hermeticity is attenuated with use and hence the electrolyte may leak.

The conventional ceramic hermetic sealing technique has a problem of corrosion of a metallic brazer. In the case of the Ni—Cd battery or Ni—MH battery, as the metallic brazer 10a, 10b for brazing the ceramic material 9, silver (Ag) brazer or silver-copper (Ag—Cu) brazer (containing Cu of 15 to 40%) was used. However, when such an Ag brazer or Ag—Cu brazer is used in the nonaqueous-electrolyte battery, the metallic brazer 10a, 10b, which serves to braze the ceramic material 9 onto the negative electrode terminal 4, is brought into contact with the nonaqueous electrolyte. Thus, it might corrode owing to an alloying reaction with the alkaline metal such as lithium so that the hermeticity is lost. This might shorten the cycle life and calendar life. In order to restrain the corrosion of the brazing material, the copper brazer can be also used. However, it is very difficult to braze the ceramic material to the negative electrode terminal of Cu or Cu alloy using the Cu brazer because the melting points of the negative electrode terminal and Cu brazer are approximate to each other.

SUMMARY OF THE INVENTION

It is an object of the present invention to provide a battery in which a positive electrode terminal and negative electrode terminal are connected to a power generating element without being disturbed by a cover plate, and which is free from fear of corrosion/deterioration of member materials.

According to a first aspect of the present invention, a nonaqueous-electrolyte battery comprises: a power generating element housed in a battery case; negative and positive terminals electrically connected to negative and positive electrodes of the power generating element through the corresponding collectors, respectively, the terminals each being sealed into an opening hole of the battery case through an insulating material; and metallic rings each hermetically sealed around each of the terminals through the insulating material, the metallic rings each being sealed into the opening hole of the battery case.

In accordance with the first aspect, the metallic rings which are much smaller than the cover plate of the battery case can be previously insulatedly sealed around the terminals by means of the glass hermetic sealing or ceramic hermetic sealing. Therefore, the subsequent working of connection can be easily carried out. Specifically, the collectors, to which the terminals are connected, can be easily connected to the electrodes of the power generating element by caulking or welding. The terminals can be easily connected to the collectors connected to the electrodes of the power generating element. Further, after the terminals are connected to the electrodes of the power generating element through the collectors, the metallic rings for the terminals are fit into the openings holes of the cover plate and sealed therein by welding, and the cover plate is fit in an opening of the case body of the battery case and sealed therein. In this way, the terminals can be surely insulatedly sealed to the battery case.

According to the first aspect, the metallic rings for the terminals can be fit in opening holes provided at any suitable positions of the battery case and sealed therein by welding.

According to a second aspect, in the battery of the first aspect, the insulating material is a glass hermetic seal.

The second aspect provides a very effective means of the glass hermetic seal when the first aspect is put into practice.

According to a third aspect of the present invention, in the battery of the first aspect, the negative terminal is made of a copper or its alloy, or nickel or its alloy.

The third aspect concretes the material of the negative material in the first aspect, and is very preferable in view of the corrosion resistance and electrochemical property.

According to a fourth aspect, in the battery of the third aspect, the insulating material is a ceramic material which is brazed to the negative terminal through an Au—Cu brazer or P—Cu brazer.

The fourth aspect, when the first aspect is put into practice, concretes a very effective means of using the ceramic hermetic sealing and solves the problem thereof. The use of the Au—Cu brazer or P—Cu brazer is very efficient to solve the problem that the Ag brazer or Ag—Cu brazer, which has been commonly used for the terminal of copper family or nickel family in a conventional battery, is likely to generate a trouble due to corrosion in a nonaqueous-electrolyte battery.

When the Cu brazer is used to restrain the corrosion of the brazer, brazing was very difficult because the melting points of the negative terminal of the copper or copper alloy and that of the Cu brazer are approximate to each other. However, in the fourth aspect, the melting point of Cu is about 1083° C., whereas that of P—Cu brazer is about 710 to 925° C., and that of some Au—Cu brazers is about 1015° C. Therefore, the work of brazing can be easily carried out.

According to a fifth aspect, in the battery of the first aspect, the positive terminal is made of aluminum or its alloy, and the insulating material is a ceramic material which is brazed to the positive terminal through an aluminum brazer.

The fifth aspect uses the ceramic hermetic sealing which is an effective means as an embodiment of the first aspect. The fact that the positive electrode terminal is made of aluminum or its alloy and the metallic brazer is an aluminum brazer is preferable in view of the corrosion resistance, workability and electrochemical property.

According to a sixth aspect of the present invention, in the battery of the first aspect, the collectors are connected to the electrodes at ends in an axial direction of the power generating element which is wound in a cylindrical or elliptical-cylindrical shape.

The sixth aspect provides a particularly efficient embodiment of the first aspect. In the cylindrical or elliptical-cylindrical battery, connection among the electrodes, collectors and terminals by caulking or welding must be carried out in a small space at the ends in an axial direction of the power generating element. According to the sixth aspect, in such a battery also, connection among the electrodes, collectors and terminals can be easily carried out.

PREFERRED EMBODIMENTS OF THE INVENTION

Now referring to the drawings, an explanation will be given of embodiments of the present invention.

Figure 1:
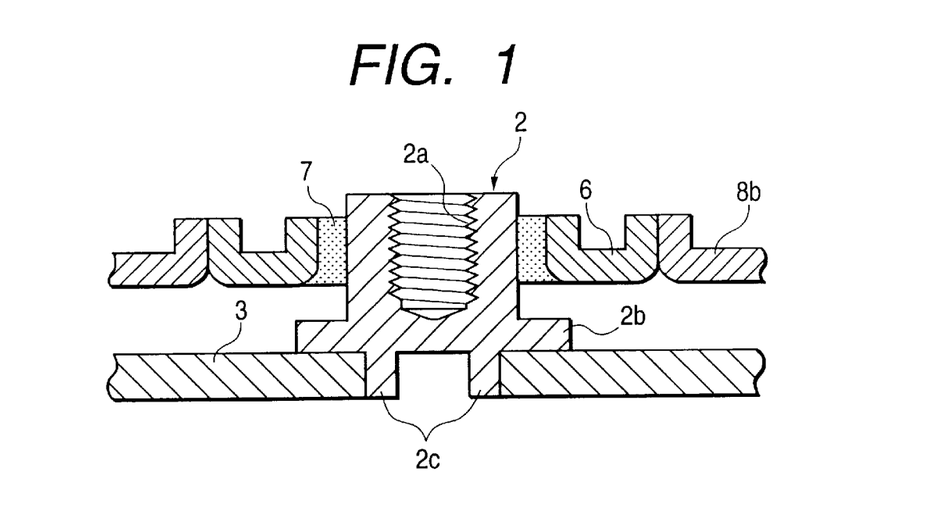
FIG. 1 is an enlarged longitudinal sectional view of a positive electrode terminal portion of a nonaqueous-electrolyte battery according to an embodiment of the present invention using the glass hermetic seal.
Figure 2:
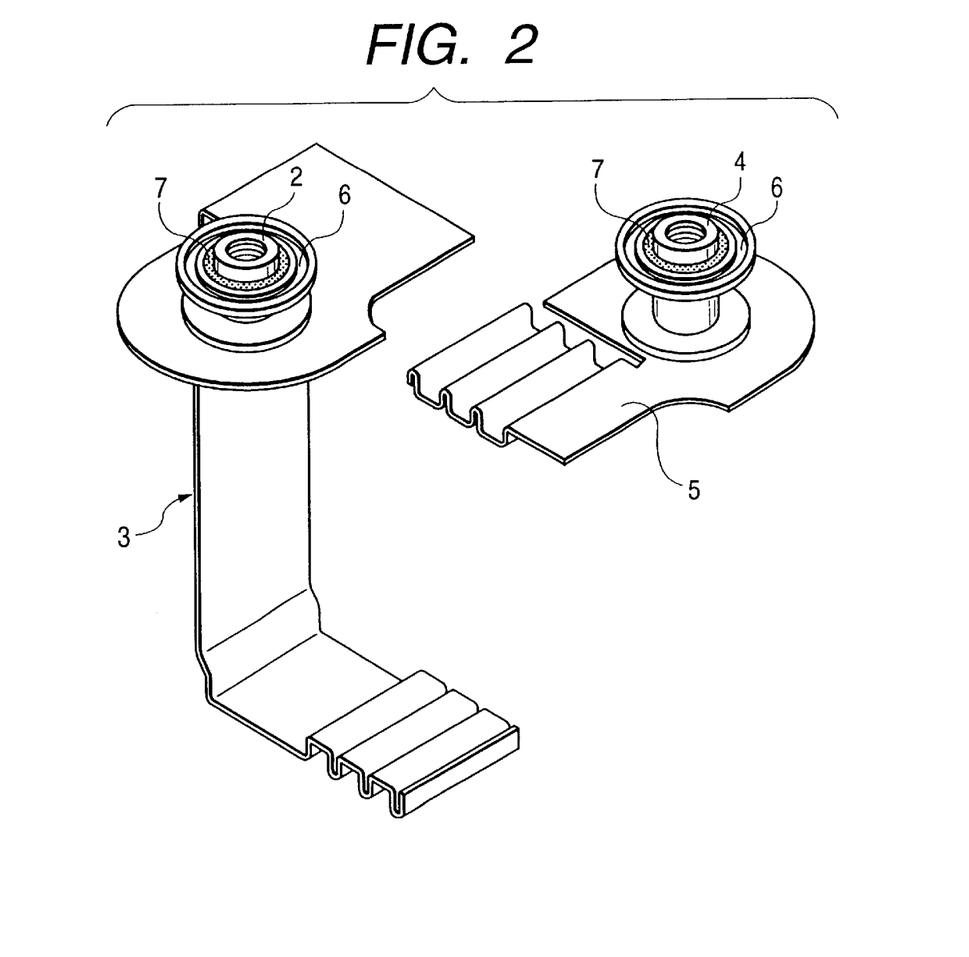
FIG. 2 is a perspective view of positive and negative electrode terminals around each of which a metallic ring is insulatedly hermetically sealed and the corresponding collectors of a nonaqueous-electrolyte battery according to an embodiment of the present invention using the glass hermetic seal.
Figure 3:
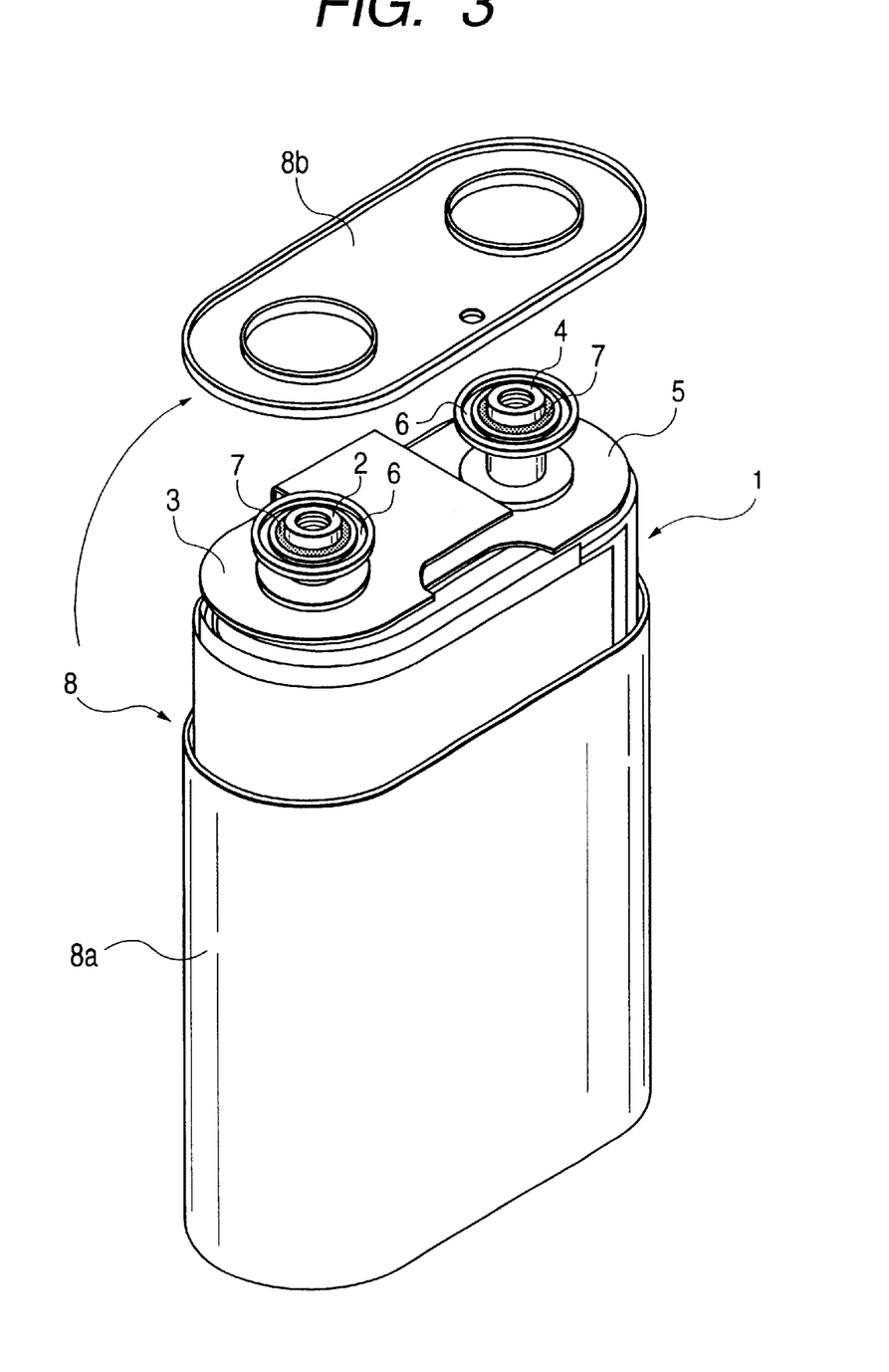
FIG. 3 is an exploded perspective view of the battery case of a nonaqueous-electrolyte battery according to an embodiment of the present invention using the glass hermetic seal.
Figure 4:
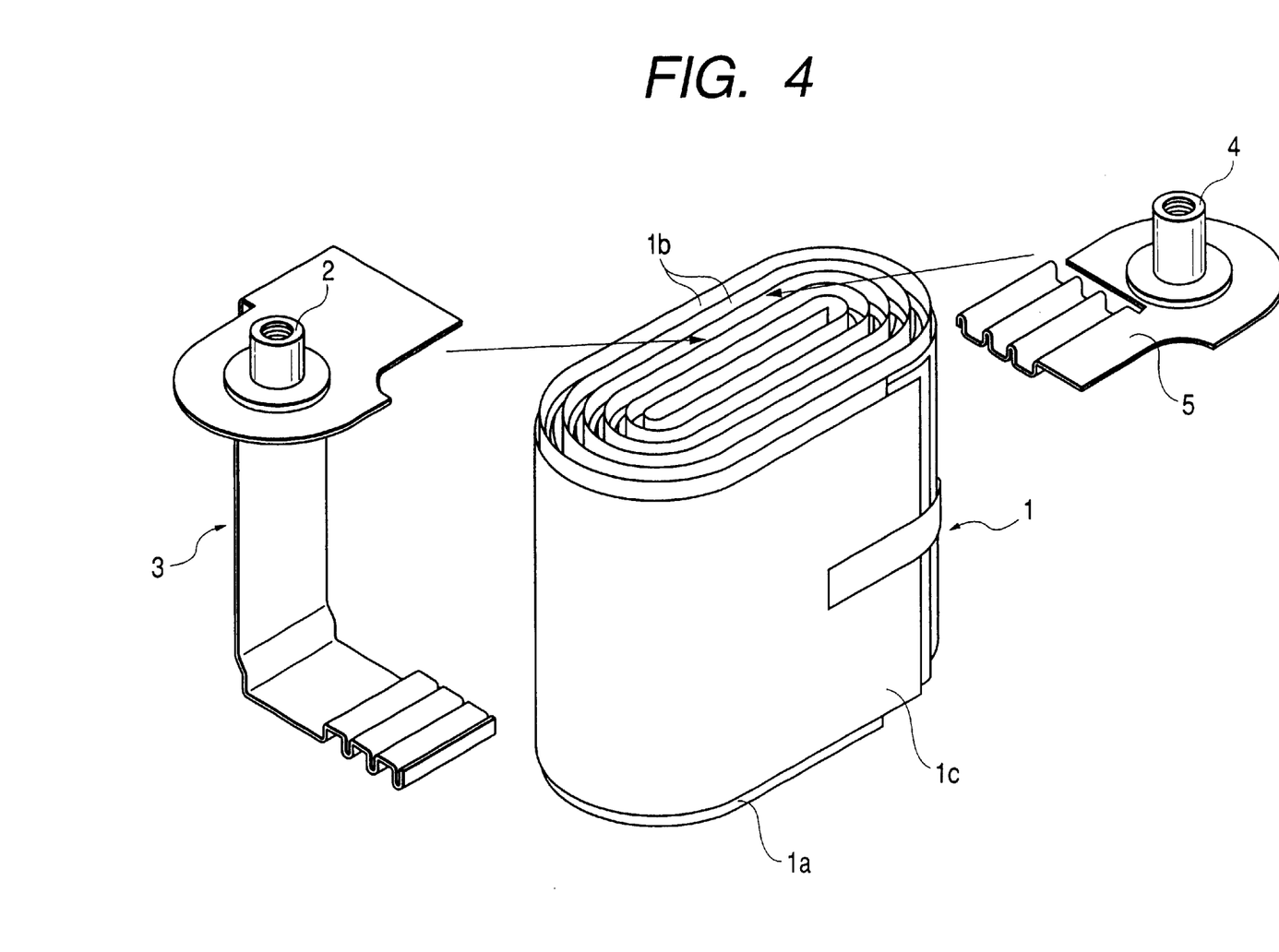
FIG. 4 is a perspective view of collectors to which positive and negative electrode terminals are hermetically connected and a power generating element in an nonaqueous-electrolyte battery according to a conventional art.

FIGS. 1 to 3 show an embodiment of the present invention using the glass hermetic sealing technique. FIG. 1 is an enlarged longitudinal sectional view of a positive electrode portion of a nonaqueous-electrolyte battery. FIG. 2 is a perspective view of negative and positive electrode terminals around which metallic rings are insulatedly sealed, and collectors. FIG. 3 is an exploded perspective view of a battery case of the nonaqueous-electrolyte battery. In FIGS. 1 to 3, the same reference numerals refer to the same elements in the conventional art as shown in FIGS. 4 to 6.

The present invention should not be limited to embodiments described below. However, this embodiment will be explained with reference to a nonaqueous-electrolyte battery having a power generating element 1 wound in an elliptical-cylindrical shape as in the conventional art as shown in FIGS. 4 and 5. As seen from FIG. 1, a positive electrode terminal 2 of the nonaqueous-electrolyte battery is made of an aluminum alloy, and its cylindrical body has a female screw portion 2a which is opened on the side of an upper surface. The positive electrode terminal 2 has a flange 2b formed on the lower end and protrusions 2c for welding which extend downward from the low end surface of the flange. The positive electrode terminal 2 can have any optional concrete structure and, for example, may have a male screw portion in place of the female screw portion 2a. Alternatively, no screw portion may be provided.

The positive electrode terminal 2 is connected to the positive collector 3 by TIG welding or laser welding in such a state where the protrusions 2c for welding are inserted in the opening hole of the positive collector 3 connected to the positive electrode 1a of the power generating element 1. Incidentally, the positive electrode terminal 2 and the positive collector 3 may also be connected to each other by brazing or caulking as well as the TIG welding or laser welding. The positive electrode terminal 2 is insulatedly sealed in a metallic ring 6 in such a manner that the neighborhood of its upper end is inserted into an inner hole of the metallic ring 6 from below and glass hermetic seal 7 is formed in the gap between itself and the metallic ring 6. The metallic ring 6 is a ring-shaped disk plate having upright portions bent upwards at inner and outer peripheral edges. The metallic ring 6 is inserted in an opening hole of the cover plate 8b of the battery case 8 and sealed to the cover plate 8b by the TIG welding or the laser welding between its outer periphery and the cover plate 8b. Therefore, like the metallic ring 6, the cover plate 8b also has an upright portion formed at the peripheral edge of its opening hole. The metallic ring 6 is preferably made of the same kind of metallic material as the cover plate 8b in order that their metallic points are made as equal as possible in welding. Concretely, the metallic ring is made of an aluminum alloy or stainless steel. Incidentally, the metallic ring 6 may be sealed in the opening hole using an adhesive. In these cases, the metallic ring may be made of an optimum metallic material. The inner hole and outer periphery of the metallic ring 6 and opening hole of the cover plate 8b should not be limited to the circular shape as in this embodiment. It is not necessarily required that the upright portion is formed in the metallic ring 6 and cover plate 8b.

The positive electrode terminal 2 having the structure as described above, to which the metallic ring is insulatedly sealed through the glass hermetic seal 7 as shown in FIG. 2, is connected to the upper portion of the positive collector 3. In this embodiment, a low melting point glass ($PbO_2$ of 70 to 80 wt %, $B_2O_3$ of 10 to 30 wt %, $SiO_2$ of 1 to 5 wt % and ZnO of 1 to 5 wt %) was used for the dielectric secure sealing. Likewise, the negative electrode terminal 4, around which the metallic ring is insulatedly sealed by the glass hermetic seal 7, is connected to the negative collector 5. If the low melting point glass is used fox the negative electrode terminal 4 as in the positive electrode terminal 2, the surface of the low melting point glass is preferably protected by a resin coating so that the corrosion of the glass is restrained. Incidentally, although the negative electrode terminal 2 and the negative collector 5 are made of a copper alloy, the metallic ring 6 sealed around the negative collector 5 may be made of the same material as in the case of the positive electrode terminal 2. If the terminals and the metallic ring 6 are made of iron, nickel or stainless steel, the glass hermetic seal may be made of a refractory metal. Further, the positive collector 3 and the negative collector 5 can withstand a high temperature like the positive electrode terminal 2 and negative electrode terminal 3. Accordingly, after the secure connection of these collectors, the glass hermetic seal 7 may be added to the positive electrode terminal 2 and negative electrode terminal 4.

The positive electrode terminal 2 and negative electrode terminal 4, to which the positive collector 3 and negative collector 5 are connected, respectively, are connected to the power generating element 1. Specifically, the copper alloy plate of the negative collector 5 is folded to form slits thereon. The upper end of the negative electrode of the power generating element 1 are inserted in and connected to the respective slits by caulking or welding. Thereafter, the positive collector 3 is connected to the lower end of the positive electrode of the power generating element 1. When the negative collector 5 is connected, the metallic ring 6, into which the negative electrode terminal 4 is insulatedly sealed, does not obstruct the working of caulking or welding because the size of the metallic ring 6 is sufficiently small. It should be noted that these positive collector 3 and negative collector may be connected to the power generating element 1 in the manner of not only the position and technique as described above but also any other possible position and technique.

Thus, the power generating element 1 is connected to the positive electrode terminal 2 and negative electrode terminal 4, each with the metallic ring 6 insulatedly sealed, through the positive collector 3 and negative collector 5. The power generating element 1 integrated with the positive electrode terminal 2 and negative electrode terminal 4, as shown in FIG. 3, is housed within an elliptical-cylindrical case body 8a of a battery case 8. The metallic rings 6 integrated with power generating element 1 through the collectors 3, 4 and terminals 2, 4 are inserted in the opening holes located at two positions of the elliptical cover plate 8b in the battery case 8 and sealed in the opening holes of the cover plate 8b by TIG welding or laser welding. In this way, the metallic rings can be easily sealed without influencing the power generating element 1. The cover plate 8b is fit in the upper opening of the case body 8a and its periphery is sealed therein by TIG welding or laser welding. Thus, the battery in which the positive electrode terminal 2 and negative electrode terminal 4 protrude upward from the opening holes of the cover plate 8b of the battery case 8 is constructed. incidentally, before the power generating element 1 is housed in the case body 8a, the metallic rings 6 may be sealed in the opening holes of the cover plate 8b.

According to the nonaqueous-electrolyte battery having the structure described above, the metallic rings 6 which are much smaller than the cover plate 8b of the battery case 8 are insulatedly sealed around the positive electrode terminal 2 and negative electrode terminal 4 individually by means of the glass hermetic seals 7. Therefore, the metallic rings 6 do not obstruct the subsequent work of caulking or welding of connecting the negative electrode terminal 4 to the power generating element 1. In addition, since the metallic rings 6 are sealed individually around the positive electrode terminal 2 and negative electrode terminal 4, the upper portion of the positive collector 3 does not obstruct the working of Connecting the negative collector 5. This permits the operation of assembling the battery to be performed easily and assures the secure connecting.

The explanation has been made on the embodiment in which the metallic ring 6 is sealed in the opening hole of the cover plate 8b. However, as understood from the advantages of the present invention described above, the metallic ring 6 secured around the terminal may be fit in the opening hole made at a suitable position of the battery case 8 as well as the cover plate 8b and sealed therein by welding or the like.

In the above embodiment, the positive electrode terminal 2 and negative electrode 4 are insulatedly heretically sealed in the metallic rings 6 through the glass hermetic seal 7. However, the ceramic hermetic sealing technique may be adopted in which an insulating ceramic ring is inserted between each of the positive electrode terminal 2 and negative electrode terminal 4 and the internal hole of the metallic ring 6, and brazing is made between each terminal and the ceramic ring and between the ceramic ring and the metallic ring.

Figure 7:
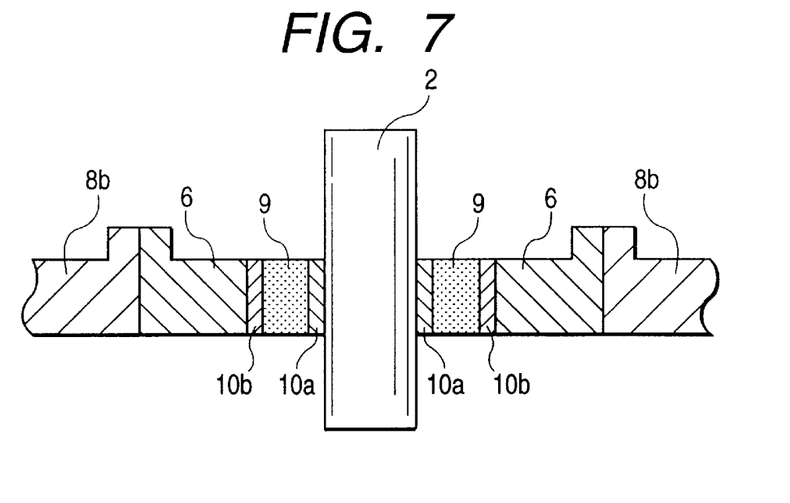
FIG. 7 is an enlarged longitudinal sectional view of a positive electrode terminal portion of a nonaqueous-electrolyte battery according to an embodiment of the present invention using the glass hermetic seal.
Figure 8:
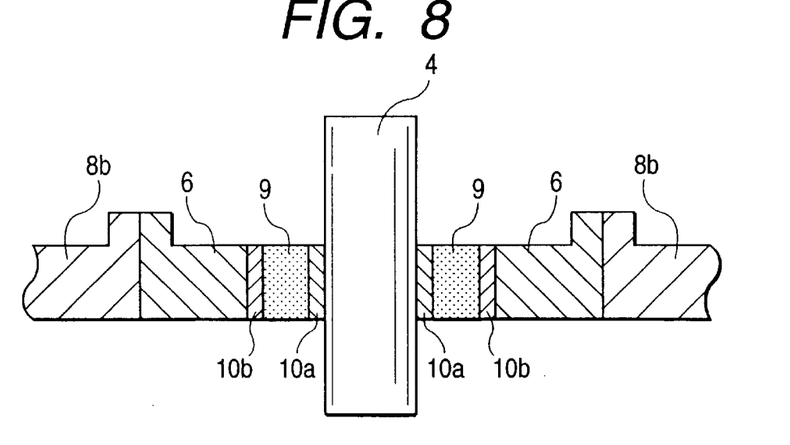
FIG. 8 is an enlarged longitudinal sectional view of a negative electrode terminal portion of a nonaqueous-electrolyte battery according to an embodiment of the present invention using the glass hermetic seal.
Figure 9:
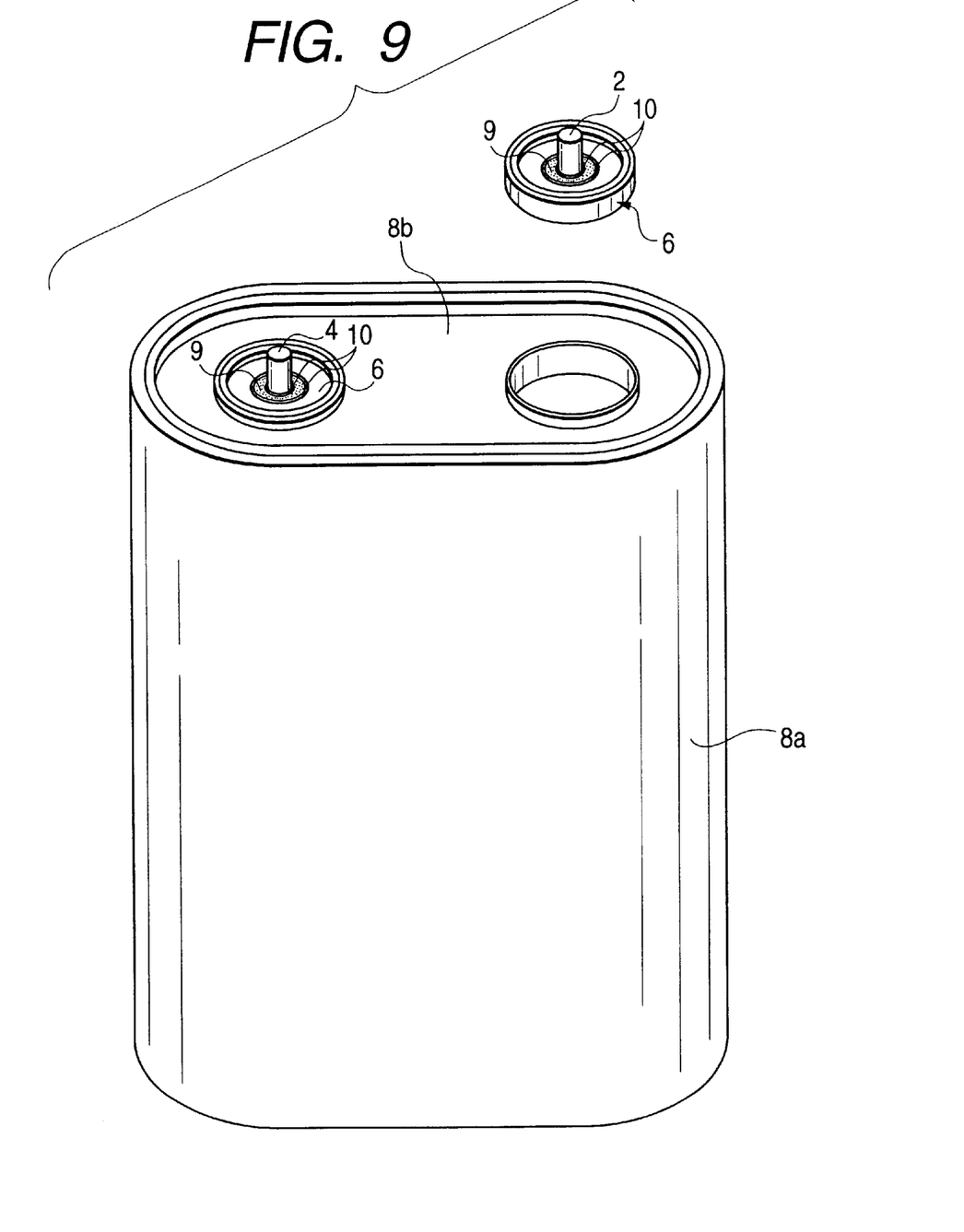
FIG. 9 is an exploded perspective view of the battery case of a nonaqueous-electrolyte battery according to an embodiment of the present invention using the glass hermetic seal.
Figure 10:
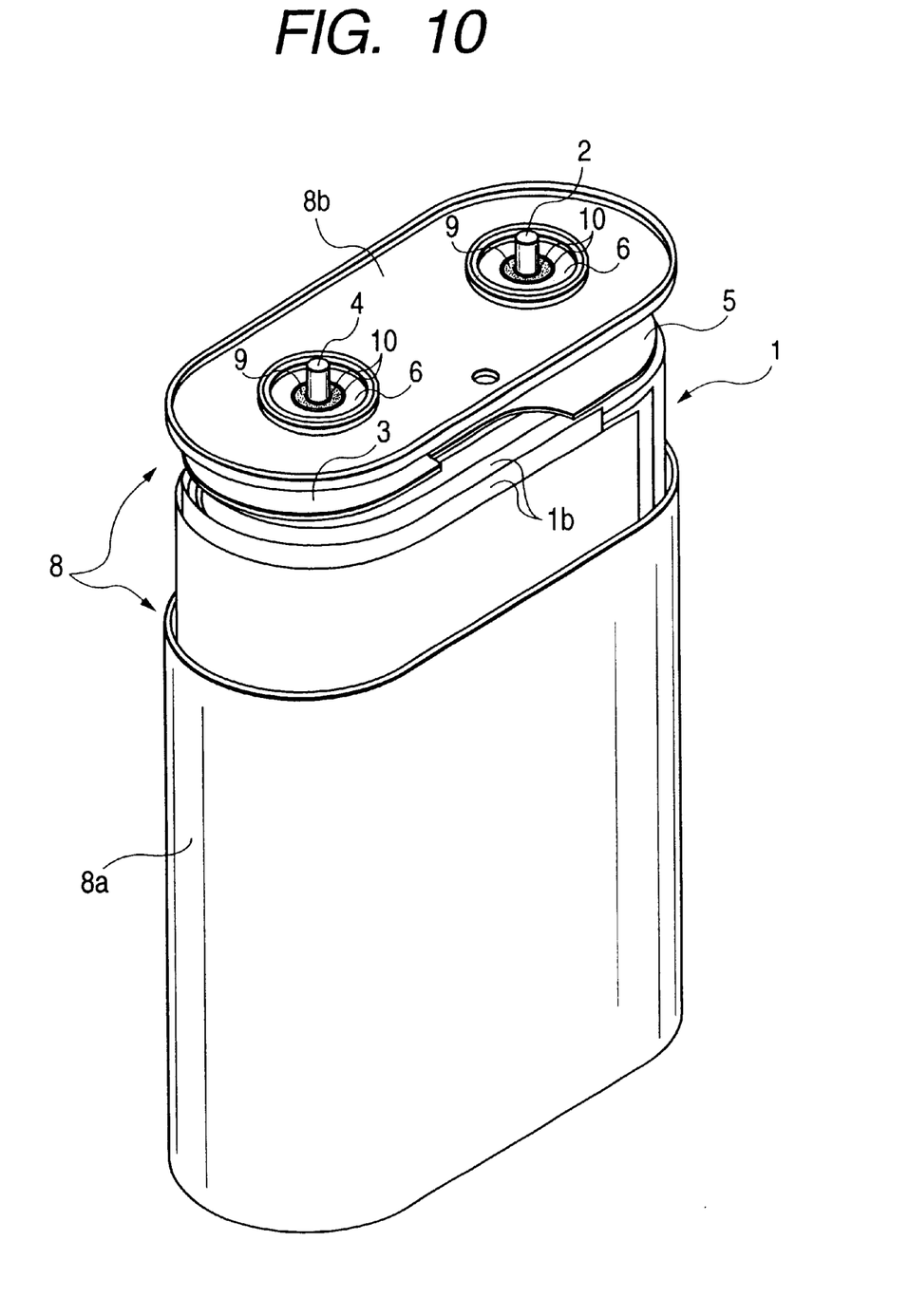
FIG. 10 is an exploded perspective view showing one example of the structure of a nonaqueous-electrolyte battery.

FIGS. 7 to 10 show an embodiment using the ceramic hermetic sealing technique according to the present invention. Specifically, FIG. 7 is a partially enlarged longitudinal sectional view of a positive electrode terminal portion of a nonaqueous-electrolyte battery. FIG. 8 is a partially enlarged longitudinal sectional view of a positive electrode terminal portion of a nonaqueous-electrolyte battery. FIG. 9 is a longitudinal sectional view of an example of the structure of a nonaqueous-electrolyte battery. FIG. 10 is an exploded perspective view showing one example of the structure of a nonaqueous-electrolyte battery. Incidentally, in FIGS. 7 to 10, the same reference numerals are given to elements which are same as in the nonaqueous electrolyte battery using the glass hermetic sealing technique, but different numerals are given to elements inherent to the ceramic hermetic sealing technique.

As shown in FIG. 10, each of the positive electrode terminal 2 and the negative electrode terminal 4 is insulatedly sealed in each of the metallic rings 6 hemetically inserted in each of the opening holes of the cover plate 8 of the battery case through a ceramic material 9. In this embodiment, although ceramics containing aluminum ($Al_2O_3$) as a main component (aluminum of 99%) was used as the ceramic material 9, the ceramic containing the aluminum component of lower than 99%. The ceramics containing zirconia ($ZrO_2$) or titania ($TiO_2$) as a main component may be used.

In this embodiment, the negative electrode terminal 4 was made from the pin of copper or copper alloy, and the ceramic material 9 was aluminum or the ceramic containing aluminum as a main component. As shown in FIG. 9, the ceramic material 9 having a rink shape is fit over the negative electrode terminal 4. The metallic ring 6 is insulatedly sealed around the negative electrode terminal 4 by brazing between the negative electrode terminal 4 and ceramic material 9 and between the ceramic material 9 and the metallic ring 6 using metallic brazers 10a and 10b, respectively. In this case, phosphor-copper (P Cu) brazer is used as the metallic brazer 10a at least between the negative electrode terminal 4 and ceramic material 9. The P—Cu brazer preferably contains Cu of 90% or more, and may contain a very small quantity of Au, Ag, Ni or zn as the third component other than phosphorus and copper However, more preferably, the phosphor-copper brazer does not contain the third component. Between the ceramic material 9 and the metallic ring 6, the other metallic brazer may be used. Where the metallic ring 6 is made of aluminum or aluminum alloy as in this embodiment, an aluminum alloy brazer is preferably used.

The metallic brazer may be adopted to meet JIS standards (Z3261, Z3263, Z3264, Z3266). Specifically, the P—Cu brazer refers to the metal containing at least P of 4.8 wt % to 8.2 wt % and Cu of 80 wt % to 95.2 wt %. An Au—Cu brazer generally refers to JIS standards BAu-1 and BAu-3 containing Au of 34.5 to 38 wt % and Cu in the most of the remaining contents. In the present invention, in view of the corrosion property, the Au—Cu brazer containing Cu of about 63 wt % is used. An Ag—Cu brazer is a metal exhibited in JIS Z3261, in which most of the component other than Ag is copper, containing Ag of 49 wt % and Cu of 29 to 51 wt %. The aluminum alloy brazer refers to an aluminum alloy containing Al of 87 to 93 wt % and Si of 6.8 to 13 wt %.

In this embodiment, the positive electrode terminal 2 is made from the pin of aluminum or aluminum alloy. Like the case of the negative electrode terminal 4, the ceramic material 9 having a ring shape is fit over the positive electrode terminal 2, and the metallic ring is fit over the ceramic material 9. The metallic ring 6 is insulatedly sealed around the positive electrode terminal 2 by brazing between the positive electrode terminal 2 and ceramic material 9 and between the ceramic material 9 and the metallic ring 6 using metallic brazers 10a and 10b, respectively. In this case, although the materials of the metallic brazers 10a, 10b are not particularly limited, an aluminum alloy brazer is preferred.

In the nonaqueous-electrolyte battery according to this embodiment, as shown in FIG. 10, the power generating element 1 is housed within the battery case body 8a of the battery case 8 and the cover plate 8b is fit in the upper opening of the battery case body 8a and sealed therein by welding. As shown in FIG. 9, the metallic rings 6 which are insulatedly sealed around the positive electrode terminal 2 and negative electrode terminal 4 are inserted in the opening holes located at two positions of the cover plate 8b and also sealed therein by welding. In this way, the respective lower ends of the positive electrode terminal 2 and negative electrode terminal 4 are connected to the positive electrode and negative electrode of the power generating element 1, respectively. A nonaqueous electrolytic solution is injected into the battery case body 8a. The cover plate 8b and battery case body 8a can be made of aluminum or aluminum alloy to reduce their weight. The metallic rings 6 are also made of aluminum or aluminum alloy.

Incidentally, in this embodiment, explained is a case where the metallic rings 6 are fitted to the cover plate 8b after housing the power generating element 1 into the battery case 8a. However, the metallic rings 6 can be insulatedly sealed into the opening of the cover plate 8b before housing the power generating element 1 into the battery case 8a. In addition to a case where the metallic rings 6 are insulatedly sealed into the opening of the cover plate 8b, the metal rings 6 fitted to the terminals are inserted into and insulatedly sealed to the openings by welding etc., which are provided on proper positions of the battery case 8 but are not necessarily provided on the cover plate 8b.

According to the nonaqueous-electrolyte battery having the structure described above, since the metallic brazer 10a in contact with the negative electrode terminal 4 is made of the brazer containing Cu as a main component, the brazer 10a is difficult to make an alloying reaction with lithium. This prevents corrosion of the metal which may generate fatal leakage of hermeticity.

The corrosion current at a lithium potential was measured by cyclic voltammetry for various brazers according to the JIS standards, i.e. BCuP-1 (P—Cu brazer containing P of about 5% and Cu of about 95%), BCuP-2 (P—Cu brazer containing P of about 7% and Cu of 93%), BAu-1 (Au—Cu brazer containing Cu of about 63%), and BAg-8 (Ag—Cu brazer containing Cu of about 28%).

Figure 11:
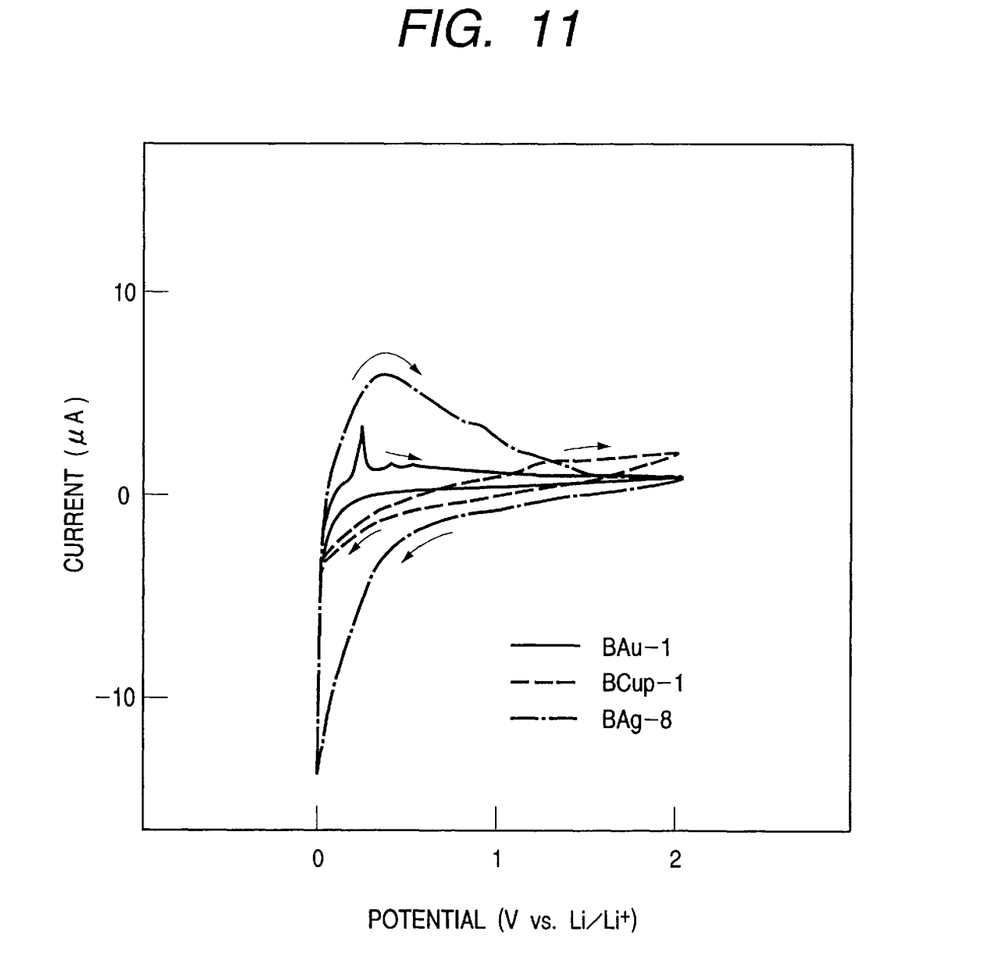
FIG. 11 is a cyclic voltammetry of several kinds of brazers.

As a test cell for the cyclic voltammetry, a three-terminal glass cell was manufactured which included an operation electrode of a rod-like brazer and an opposite electrode and reference electrode of lithium metal. The electrolytic solution was prepared by dissolving $LiPF_6$ of 1 mol in a mixed solvent of EC:DMC:DEC=2:2:1. The cyclic voltammetry was carried out by sweeping the potential over a potential range from 0 V to 2 V for the lithiummetallic electrode. The sweeping speed was set at 1 mV/sec. The test was carried out in a globe box displaced to an argon atmosphere. The test result is shown in FIG. 11.

The result of cyclic voltammetry after repetition of several cycles is as follows. In BCuP-1 and BCuP-2, the corrosion current has ceased to flow and in BAu-1, the corrosion current has become very small, whereas in BAg-8, the corrosion current has flowed. The rod-like brazer short-circuited to the lithium was held for a week in an atmosphere at a temperature of 60° C. Thereafter, the surface of the rod-like brazer was observed. As a result, BAg-8 containing less amount of Cu suffered severe corrosion and crack and was decided that it cannot be actually used. BAu-1 containing a comparatively more amount of Cu suffered discoloration into brown and but did not suffer the corrosion and crack. BCuP-1 and BCUP-2 which are P—Cu brazers did not suffer the corrosion.

In view of the above test result, it was decided that the Au—Cu brazer and the P—Cu brazer can be actually used. This is because these brazers contain a more amount of cu that is electrically stable at a lithium metallic potential and does not contain the metal such as Ag that is electrically unstable at the lithium metal potential and is liable to make an alloy with lithium. The melting point of Cu is about 1083° C., whereas that of P—Cu brazer is about 710 to 925° C., and that of some Au—Cu brazers is about 1015° C. Their melting point is extremely lower than that of Cu. Therefore, the Au—Cu brazer and P—Cu brazer can be easily brazed even when the negative electrode terminal is made of Cu or Cu alloy.

Incidentally, as representative examples of the metallic brazer for the test, BCuP-1 and BCuP-2 were used as the P—Cu brazer and BAu-1 was used as the Au—Cu brazer. However, when the present invention is put into practice, other kinds of P—Cu brazers and Au—Cu brazers, which belong to other names ("kinds" in the JIS standard) may be used.

The nonaqueous-electrolyte battery was manufactured by brazing the ceramic material 9 using BCuP-1 and BAu-1 which were decided to be actually usable. This battery was subjected to repeated charging/discharging. As a result, the battery did not suffer the corrosion which is problematic in an actual use. However, with regard to a point of an indication of the slight corrosion in case of using Au brazer, an anti-corrosion film such as nickel-plating is formed on the surface of Au brazer, which contacts to the nonaqueous electrolyte, thereby further improving the reliability of anti-corrosion ability.

Incidentally, $LiCoO_2$ was used as a positive active material of the battery, graphite was used as a negative active material and the electrolytic solution was prepared by dissolving $LiPF_6$ of 1 mol in a mixed solvent of EC:DMC:DEC=2:2:1 for the battery practically studied. The structure of the manufacture battery is an elliptical-cylindrical spiral type nonagueous electrolytic lithium secondary battery as show in FIG. 10. Incidentally, the structure and shape of the nonaqueous electrolyte battery to which the present invention is applied by using the ceramic hermetic seal technique are not limited to the above-described embodiments.

As understood from the description hitherto made, in the battery according to the present invention, since the electrode terminal and metallic ring are insulatedly hemetically sealed to each other by the glass hermetic seal or ceramic hermetic seal, the workability of connecting the terminal to the electrode of the power generating element through the corresponding collector can be improved and the fear of insufficient connection can be removed. In addition, use of the glass or ceramic removes the fear of liquid leakage due to secular deterioration of the sealing material. Further, in the ceramic hermetic seal, since the Au—Cu brazer or P—Cu brazer is used as the metallic brazer in contact with the negative electrode terminal, its corrosion due to the alloying reaction with alkaline metal such as lithium. This prevents the cycle life or calendar life due to hermeticity leakage from being shortened and relaxes the manufacturing condition at a lowered brazing temperature.

What is claimed is:
1. A nonaqueous-electrolyte battery comprising:
   a power generating element housed in a battery case, said power generating element including a positive electrode and a negative electrode;

negative and positive terminals electrically connected to negative and positive electrodes of said power generating element through negative and positive collectors, respectively, said terminals each being sealed into an opening hole of said battery case through an insulating material, said insulating material comprising a ceramic material which is brazed to said negative terminal through an Au—Cu brazer or a P—Cu brazer; and metallic rings each hermetically sealed around each of said terminals through said insulating material, said metallic rings each being hermetically sealed into said opening hole of the battery case.

2. A nonaqueous-electrolyte battery according to claim 1, wherein said negative terminal comprises one of copper, copper alloy, nickel and nickel alloy.

3. A nonaqueous-electrolyte battery according to claim 1, wherein said positive terminal comprises one of aluminum and aluminum alloy, and said insulating material comprises a ceramic material which is brazed to said positive terminal through an aluminum brazer.

4. A nonaqueous-electrolyte battery according to claim 1, wherein said negative and positive collectors are connected to said negative and positive electrodes, respectively, at ends in an axial direction of said power generating element which is wound in a cylindrical or elliptical-cylindrical shape.

5. A nonaqueous-electrolyte battery comprising:

a battery case having a cover plate, said cover plate having a first and a second opening and comprising a first and a second upright portion formed at a peripheral edge of said first and second openings, respectively;

a power generating element housed in said battery case, said power generating element including a positive electrode and a negative electrode;

negative and positive terminals electrically connected to negative and positive electrodes of said power generating element through negative and positive collectors, respectively, said terminals each being sealed into said first and second openings of said cover plate through an insulating material; and a first and a second metallic ring, each ring comprising a ring-shaped disk plate having an inner and an outer upright portion, which are bent upwards at an inner and an outer peripheral edge of said metallic rings, each ring being hermetically sealed around each of said terminals through said insulating material, and said first and second rings being hermetically sealed into said first and second openings of said cover plate.

6. A nonaqueous-electrolyte battery according to 5, wherein said insulating material is a glass hermetic seal.

7. A nonaqueous-electrolyte battery according to claim 5, wherein said negative terminal comprises one of copper, copper alloy, nickel and nickel alloy.

8. A nonaqueous-electrolyte battery according to claim 7, wherein said insulating material comprises a ceramic material which is brazed to said negative terminal through an Au—Cu brazer or a P—Cu brazer.

9. A nonaqueous-electrolyte battery according to claim 5, wherein said positive terminal comprises one of aluminum and aluminum alloy, and said insulating material comprises a ceramic material which is brazed to said positive terminal through an aluminum brazer.

10. A nonaqueous-electrolyte battery according to claim 5, wherein said negative and positive collectors are connected to said negative and positive electrodes, respectively, at ends in an axial direction of said power generating element which is wound in a cylindrical or elliptical-cylindrical shape.

* * * * *